United States Patent
Enlow et al.

[11] Patent Number: 6,022,916
[45] Date of Patent: Feb. 8, 2000

[54] PROCESSING STABILIZER FORMULATIONS

[75] Inventors: William P. Enlow, Belpre, Ohio; Roger W. Avakian, Parkersburg, W. Va.

[73] Assignee: General Electric Company, Pittsfield, Mass.

[21] Appl. No.: 08/288,670

[22] Filed: Aug. 9, 1994

Related U.S. Application Data

[62] Division of application No. 08/038,413, Mar. 29, 1994, Pat. No. 5,414,034.

[51] Int. Cl.$^7$ ....................................................... C08K 5/49
[52] U.S. Cl. ............................ 524/120; 264/211; 524/151; 524/400
[58] Field of Search ............................. 264/211; 524/120, 524/400, 151

[56] References Cited

U.S. PATENT DOCUMENTS

| | | |
|---|---|---|
| 2,604,667 | 7/1952 | Hebeler . |
| 3,002,804 | 10/1961 | Kilian . |
| 3,771,307 | 11/1973 | Petrille . |
| 3,772,872 | 11/1973 | Piazza et al. . |
| 4,105,609 | 8/1978 | Machon et al. ........................ 524/400 |
| 4,134,882 | 1/1979 | Frankfort et al. . |
| 4,156,071 | 5/1979 | Know . |
| 4,302,383 | 11/1981 | Valdiserri et al. . |
| 4,305,866 | 12/1981 | York et al. . |
| 4,366,280 | 12/1982 | Yukawa . |
| 4,403,053 | 9/1983 | Lewis . |
| 4,413,078 | 11/1983 | Lewis et al. . |
| 4,425,464 | 1/1984 | Allen et al. ............................ 524/400 |
| 4,888,369 | 12/1989 | Moore, Jr. . |
| 4,994,529 | 2/1991 | Sekiguchi et al. . |
| 4,997,888 | 3/1991 | Sekiguchi et al. . |
| 5,023,285 | 6/1991 | Horn . |
| 5,227,418 | 7/1993 | Mueller et al. . |

FOREIGN PATENT DOCUMENTS

| | | |
|---|---|---|
| 61-91237 | 5/1986 | Japan . |
| 903427 | 8/1962 | United Kingdom . |
| 1487843 | 10/1977 | United Kingdom . |
| 1574305 | 9/1980 | United Kingdom . |

*Primary Examiner*—Veronica P. Hoke

[57] ABSTRACT

Melt extrusion processes involving phosphite stabilized polyolefin compositions subject to solid by-product formation during melt extrusion are improved by the addition of a metal salt of a lactic acid to the composition. The processes involving the improved compositions exhibit reduced levels of screen pack plugging during fiber and film extrusion processes than that achieved with fatty acid salts, such as calcium stearate.

10 Claims, 1 Drawing Sheet

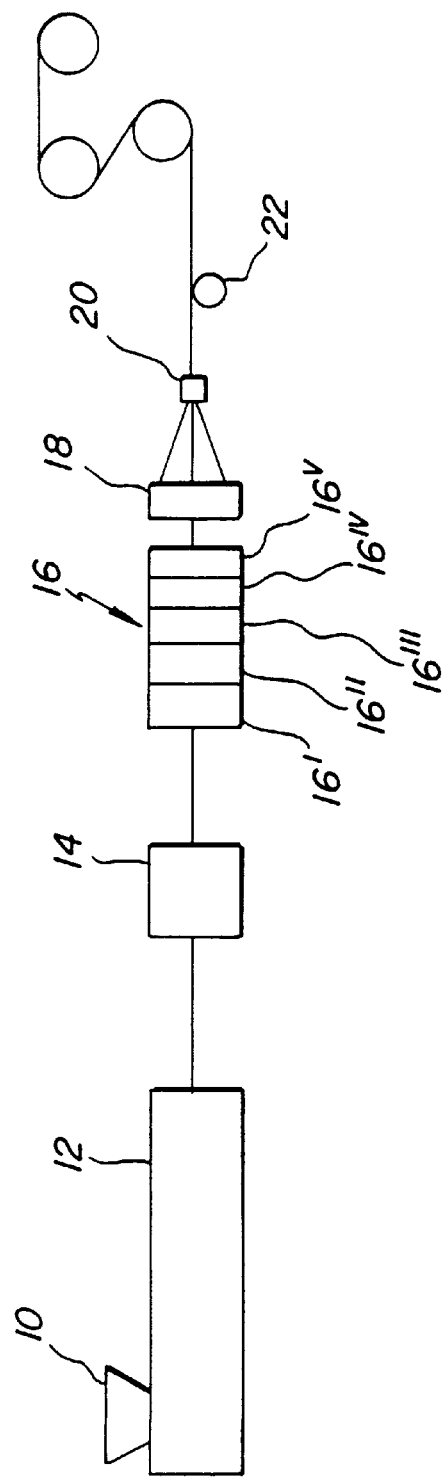
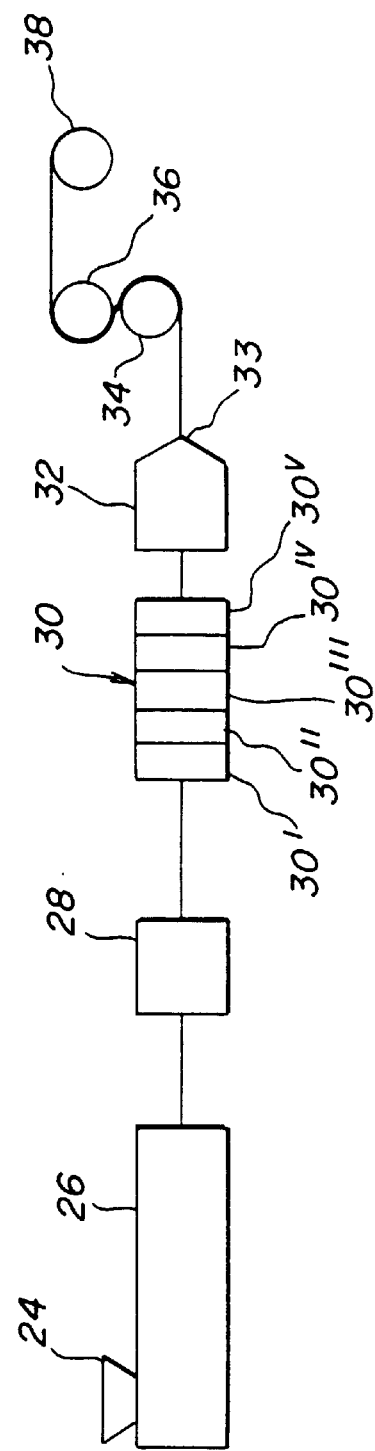

PROCESSING STABILIZER FORMULATIONS

This is a divisional of application Ser. No. 08/038,413 filed on Mar. 29, 1994 now U.S. Pat. No. 5,414,034.

BACKGROUND OF THE INVENTION

Field of the Invention

The present invention relates to a melt extrusion processes, and more particularly relates to melt extrusion processes for making polypropylene fibers or films.

BACKGROUND OF THE INVENTION

Processes for making polymeric fibers and films are known, see U.S. Pat. Nos. Knox, U.S. Pat. No. 4,156,071, issued May 22, 1979, Frankfort et al, U.S. Pat. No. 4,134,882, issued Jan. 16, 1979, Piazza et al., U.S. Pat. No. 3,772,872, issued Nov. 20, 1973, Petrille, et al., U.S. Pat. No. 3,771,307, issued Nov. 13, 1973, Kilian, U.S. Pat. No. 3,002,804, issued Oct. 3, 1961, Coates et al., U.S. Pat. No. 2,957,747, issued Oct. 25, 1960, Hebeler, U.S. Pat. No. 2,604,667, issued Jul. 29, 1952, all of which are incorporated herein by reference, and Great Britain Patent Nos. 903427, published Aug. 15, 1962, 1487843, published Oct. 5, 1977 and 1574305, published Sep. 3, 1986, all of which are incorporated herein by reference. Phosphites are known stabilization additives for polyolefins, see York, U.S. Pat. No. 4,305,866, Lewis, U.S. Pat. No. 4,403,053, issued Sep. 6, 1983 and Valdiserri et al, U.S. Pat. No. 4,302,383, issued Nov. 24 1981, all of which are incorporated herein by reference.

Polyolefin processors are attempting to process polymer at increasing temperatures and with increased shear and work on the polymer. They are also processing polymer which may contain polymerization catalyst residues. The total residual metal content has been decreasing in recent years but the catalyst residue may still be active.

This combination of more abusive processing conditions and the possibility of catalyst residue still being active may lead to difficulties when trying to process the polymers.

Catalyst "neutralizers" are well known in the art and are generally used in most formulations to inhibit corrosion of processing equipment resulting from catalyst residues. Typical examples would be: Ca, Zn, or Mg Stearates, Ca, Zn, or Mg oxides and synthetic hydroftalcite compositions such as a product manufactured and sold by Kyowa as DHT4A. Additionally products such as the Calcium Stearoyl Lactates and Calcium Lactates have been shown to be beneficial in catalyst neutralization as evidenced by reduced corrosion.

In many of the high temperature melt processes such as fiber spinning and film manufacture, screen packs are utilized to remove small particles which may be in the polymer prior to the polymer passing through the small orifices used in fiber and film processes. With the higher processing temperature/high shear applications there is a tendency for some combinations of polymers and additive formulations to be prone to screen pack plugging.

Specifically, it has been discovered, however, that stabilized polyolefin compositions containing residual catalysts, can generate solid byproducts during melt extrusion processes. These solids must be filtered out from the melt stream.

For example, melt stream fiber forming processes and film forming processes or the fiber and/or film forming dies will become clogged or the final articles (films/fibers) will exhibit defects and blemishes. Too much solid generation will lead to frequent filter clogging, referred to as screen pack plugging, which leads to increased processing pressures and reduced process throughput.

Consequently, there is a need for improved polyolefin compositions and improved melt extrusion processes that will exhibit reduced solid byproduct formation and a resulting reduced filter clogging and a reduced increase in processing pressure and improve in throughputs.

BRIEF DESCRIPTION OF THE DRAWINGS

FIG. 1 is a schematic drawing of the process of the present invention for making fibers, and FIG. 2 is a schematic drawing of the process of the present invention for making films.

SUMMARY OF THE PRESENT INVENTION

The present invention involves an improved polyolefin melt extrusion process that exhibits reduced filter clogging. The process involves (a) forming a polyolefin composition comprising a polyolefin resin, a phosphite stabilizer, a metal salt of a lactic acid and optionally a primary antioxidant, (b) melt extruding the composition through a filter to produce a filtered melt stream, and (c) passing the melt stream through a die to make the plastic article. The utilization of the metal salt of a lactic acid results in reduced filter clogging.

DETAILED DESCRIPTION OF THE INVENTION

The olefin polymers contemplated herein include homopolymers and copolymers of monoolefins, preferably those monoolefins containing 1–4 carbon atoms. Illustrative examples include polyethylene (including low density, high density, ultra high molecular weight and linear low density polyethylene), polypropylene, EPDM polymers, ethylene-propylene copolymers and polyisobutylene. The stabilization of mixtures of any of these olefin polymers and copolymers likewise is contemplated.

Any polypropylene resin melt extrusion process involving polymer filtration can be improved by the process of the present invention, including propylene homopolymers and random or block copolymers of propylene and an a-olefin which contain ethylene or other a-olefin in an amount from 1 to 30 wt. % as well as blends of polypropylene with other olefin polymers and copolymers, such as low and high density polyethylene, ethylene/vinyl acetate copolymer, ethylene/propylene copolymer rubbers and styrene/butadiene block-copolymer rubbers.

Phosphites may be replaced in whole or in part with a phosphonite. The compositions preferably employ a phosphorous containing component selected from the group consisting of tetrakis(2,4-di-t-butyl-phenyl)4,-4'-biphenylylene diphosphonite, tris(2,4-di-t-butylphenyl)-phosphite, trisnonylphenyl phosphite, bis(2,4-di-t-butylphenyl)pentaerythritol diphosphite optionally with 1% tri-isopropyl amine, bis(distearyl)pentaerythritol diphosphite, and bis(distearyl)pentaerythritol diphosphite with one percent (1%) triethanolamine.

Phosphites may also be referred to as organic phosphite esters.

The organic phosphite ester is preferably a pentaerythritol diphosphite which in most instances is characterized by a spiro structure, i.e.,

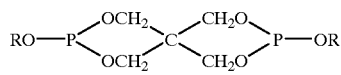

where R is an organic radical. Particularly preferred radicals (for R) are alkyl and alkylphenyl. When R is alkyl it should contain 10 to 20 carbon atoms, inclusive, and an especially desirable phosphite is distearyl pentaerythritol diphosphite, when R is alkylphenyl the alkyl substituents should contain 3 to 10 carbon atoms and, preferably, should be tertiary alkyl groups. Tertiarybutyl radicals are especially preferred. The alkylphenyl groups may contain up to three alkyl substituents. The alkyl groups preferably are bulky, i.e., tertiary or secondary alkyl groups. Such alkyl groups include isopropyl, sec-butyl, tertiarybutyl, a-amyl, tertiaryamyl, n-hexyl, 2,2-dimethylbutyl, 2-methyl-2-ethylpropyl, phenyl ethyl and tertiaryoctyl. The two alkyl groups are preferably in the 2, 4, or 6 positions or combinations thereof in the 2,4-positions or 2,6-positions. A particularly preferred species is bis-(2,4-ditertiarybutylphenyl) pentaerythritol diphosphite. Another preferred species is bis-(2,6-ditertiarybutyl-4-methylphenyl) pentaerythritol diphosphite.

The phosphite esters may be made by a variety of methods. Bis alkyl or AlkylAryl Pentaerythritol diphosphites may be prepared via the teachings of U.S. Pat. Nos. 4,305,866, 5,137,950, 4,064,100 or other means described in the literature.

Other phosphite antioxidants which can be employed include trioctylphosphite, trilaurylphosphite, tridecylphosphite, octyl diphenylphosphite, tris(2,4-di-t-butylphenyl) phosphite, tris(nonylphenyl) phosphite, hexa(tridecyl) 1,1,3-tris(2-methyl-4-hydroxy-5-t-butylphenyl) butane triphosphite, tetra($C_{12-15}$alkyl) 4,4'-isopropylidenediphenol diphosphite, tetra(tridecyl)4,4'-butylidenebis(3-methyl-6-t-butylphenol) diphosphite, hydrogenated-4,4'-isopropylidenediphenol polyphosphite, distearyl pentaerythritol diphosphite, phenyl 4,4'-isopropylidenediphenol pentaerythritol diphosphite, bis(2,4-di-t-butylphenyl) pentaerythritol diphosphite, bis(2,6-di-t-butyl-4-methylphenyl) pentaerythritol diphosphite, di(nonylphenyl) pentaerythritol diphosphite and 4,4'-isopropylidenebis (2-t-butylphenol) di(nonylphenyl) phosphite.

Phenolic antioxidants which can be employed in the invention include, but are not limited to, 2,6-di-t-butyl-p-cresol, 2,6-di-phenyl-4-octadecyloxyphenol, stearyl(3,5-di-t-butyl-4-hydroxyphenyl)-propionate, distearyl-3,5-di-t-butyl-4-hydroxybenzylphosphonate, thio-diethylenebis(3,5-di-t-butyl-4-hydroxyphenylpropionate, hexamethylene-bis (3,5-di-t-butyl-4-hydroxyphenylpropionate, 4,4'-thiobis(6-t-butyl-m-cresol), 2-octylthio-4,6-bis(3,5-di-t-butyl-4-hydroxyphenoxy)-s-triazine, 2,2'-methylenebis(4-methyl-6-t-butylphenol), 2,2'-methylene-bis(4-ethyl-6-t-butylphenol), bis(3,3-bis(4-hydroxy-3-t-butylphenyl) butylic acid) glycol ester, 4,4'-butylidenebis (6-t-butyl-m-cresol), 2,2'-ethylidenebis(4,6-di-t-butylphenol), 2,2'-ethylidenebis(4-sec-butyl-6-t-butylphenol), 3,6-dioxaoctylenebis(3-methyl-5-t-butyl-4-hydroxyphenylpropionate), 1,1,3-tris(2-methyl-4-hydroxy-5-t-butylphenyl)butane, bis(2-t-butyl-4-methyl-6-(2-hydroxy-3-t-butyl-5-methyl benzyl)phenyl) terephthalate, 1,3,5-tris(2,6-dimethyl-3-hydroxy-4-t-butylbenzyl) isocyanurate, 1,3,5-tris(3,5-di-t-butyl-4-hydroxybenzyl) isocyanurate, 1,3,5-tris(3,5-di-t-butyl-4-hydroxybenzyl)-2,4,6-trimethylbenzene, 1,3,5-tris((3,5-di-t-butyl-4-hydroxyphenyl)propionyloxyethyl) isocyanurate, tetrakis(methylene-3-(3,5-di-t-butyl-4-hydroxyphenyl)-propionate)methane.

Metal salts of lactic acids, include metal salts of blends of lactic acid with other organic acids such as fatty acids. Preferred metal salts of lactic acid include calcium lactate and calcium stearoyl lactate. Suitable metals include alkaline earth metals such as calcium, barium, strontium and radium. Suitable metals also include alkali metals such as lithium, sodium, potassium, rubidium, cesium, francium, cadium, lead, zinc, tin, magnesium and antimony. Preferably the metal is bivalent so that the salt may be a co-salt of lactic acid and a fatty acid. Organic acids suitable for use in combination with the lactic acid include stearic acid, lauric acid, palmitic acid, butyric acid and other $C_4$ to $C_2$ fatty acids, including both saturated and unsaturated fatty acids, including linoleic and linolenic acids. Suitable fatty acids may be represented by the formula:

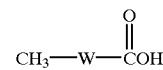

wherein W is a $C_2$–$C_{20}$ saturated or unsaturated group. Saturated fatty acids may be represented by the formula:

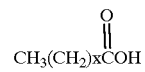

wherein x is selected from 2 to 27.

The preferred salts are bivalent metal co-salts of lactic acid and a fatty acid, preferably a saturated fatty acid. The preferred bivalent metal is calcium. The preferred saturated fatty acid is stearic acid. The preferred metal co-salt is calcium stearoyl lactate. Suitable other co-salts of lactic acid include calcium lauroyl lactate, calcium palmitoyl lactate and calcium butroyl lactate.

The polyolefin resin compositions preferably comprise from 50 to 99.9 weight percent polyolefin resin, more preferably from 90 to 99.5 weight percent thereof, and most preferably from 95 to 99 weight percent thereof based on the total weight of the composition; from 0.001 to 5 weight percent phosphite, more preferably from 0.005 to 3 weight percent thereof, and most preferably from 0.025 to 1 weight percent thereof based on the total weight of the composition; and preferably comprises from 0.01 to 5 weight percent metal salt of lactic acid, more preferably from 0.05 to 3 weight percent thereof, and most preferably from 0.05 to 1 weight percent thereof based on the total weight of the composition.

The composition may also contain or be free of other additives such as waxes, antistatic agents, flame retardants, nucleating agents, plasticizers, hindered amine light stabilizers, and hindered phenolic antioxidants. Optionally the composition contains a hindered phenolic antioxidant at a level of from 0.001 to 5 weight percent, more preferably at a level of from 0.001 to 3 weight percent thereof, and most preferably at a level of from 0.025 to 0.3 weight percent thereof based on the total weight of the composition.

Polyolefin fibers are typically made by melt spinning processes. Melt spinning requires that the polyolefin polymers be stable at temperatures sufficiently above the melting point or softening point of the polyolefin to be extruded in the molten state without substantial degradation. The melt spinning process employs a spinneret, which is a plate containing orifices through which molten polymer is extruded under pressure. Typically the spinneret is made of stainless steel or a nickel alloy. The spinneret is a flat plat, flush with or recessed in its mounting. Spinnerets for molten polymers are usually from 3 mm to 10 mm thick, for melt process pressures of up to 3000 psi. Fibers forming spinneret holes may have exit diameters of from 175 to 750 microns. The number of holes in the spinneret may range from a few to several thousand. A typical process is shown schematically in FIG. 1, wherein the polyolefin composition in particulate form is fed via a hopper 10 to a screw type extruder 12 wherein the composition is melted at elevated temperatures to form a melt stream which is forced at elevated pressures to a metering pump 14 which controls the flow. Optionally there may be a filtration unit (not shown) located at the exit of the extruder 12. The melt stream is then forced through a filter 16, preferably a screen pack filter of filters in series ($16^i$, $16^{ii}$, $16^{iii}$, $16^{iv}$, $16^v$) with the upstream filters being of a mesh for collecting only large particles and subsequent downstream filters being increasingly fine for collecting smaller particles that pass through the upstream filters, which removes unmelted solids prior to the melt stream reaching the spinneret 18. The filtered use of stream is then forced to the spinneret 18 wherein fibers are formed by passing the melt stream through the die holes of the spinneret. The fibers are then air cooled and converged into the convergence guide 20, then directed to the finish application 22, reels 24, 26, and finally to the spin bobbin 28 wherein the fiber is wound for storage.

As shown in FIG. 2, a film making process may involve feeding polyolefin particulates (pellets or powder) to a hopper 24 of a screw type extruder 26 wherein the particulates are melted and forced to a metering pump 28 (optional) and then forced through a filtering system (preferably a screen pack) 30 which preferably has a series of filters ($30^i$, $30^{ii}$, $30^{iii}$, $30^{iv}$ and $30^v$) which have increasingly fines mesh as the polyolefic melt flows downstream. The filter screens out the unmelted solid by-products before the polyolefin melt stream reaches the die 32 so that the dies orifice 33 will not become clogged by the solid by-products. The melt stream flows from the filter system 30 to the die 32, through the elongated die orifice 33, forming a polyolefin film which then passed partially around and between calendar rolls 34, 36 to storage roll 38 whereupon the film is wound and stored.

As shown in the drawings, before reaching the spinneret, the molten polymer is filtered through a series of sintered or fibrous metal gauzes or a bed of graded fine refractory material, such as sand or alumina, held in place by metal screens. Filtration removes large solid or gel particles that might otherwise block spinneret holes or, if passed through, occupy sufficient cross-sectional area in the filament to affect its processing or tensile properties. Smaller particles, such as delusterants, are not retained by the filter. Filtration also provides shearing, and thus can influence Theological behavior.

EXAMPLES

Example 1 was a polypropylene composition containing 500 parts per million by weight (ppm) bis(2,4-di-tert-butylphenyl) pentaerythritol diphosphite (sold under the trademark Ultranox 626 by GE Specialty Chemicals Inc.), 250 ppm of a hindered phenolic compound (sold under the trademark Irganox 3114 by B.F. Goodrich), 500 ppm Calcium Stearoyl Lactate (sold under the trademark Pationic 930 by Patco Polymer Additives Div., American Ingredient, Co.). The polyproylene base resin used in the compositions of the examples was Himont Profax 6301 resin.

Comparative Example 2 has a polypropylene composition as an Example 1, but 500 ppm of Calcium Stearate was used in place of the Calcium Stearoyl Lactate.

Test method—Polypropylene is compounded with additives. Our laboratory compound method 450° F. stock temperature using a 24:1 L/D 1" 2 stage screw with a Maddox mixer between stages. A screen pack composed of 20/100/500/100/20 mesh screens is utilized. Polypropylene is re-extruded using a ¾" Brabender extruder with a single stage screw 2:1 compression having a Maddox mixer 6" from the screw tip. The output of the extruder is throttled to a ¼" diameter focus on a screen pack. The screen pack is composed of 20/100/1400×125/100/20 screens. Back pressure is set to 200–300 psi.

The extrusion is performed at 600° F. stock temperature operating the extruder at 10 rpm for 50 min and 50 rpm for 10 minutes out of every hour. Back pressure is set at 200–300 psi. The extrusion is performed until significant pressure rise occurs or if none is observed for 13–16 hrs.

TABLE 1

| Examples | Ex 1 | CEx 2 |
| --- | --- | --- |
| Back Pressure Increase, psi | 0(13 hrs) | + 500(8 hrs) |

Note that the examples of the present invention exhibited no back pressure increase after 13 hours of operation whereas the comparative example exhibited a +500 psi increase in back pressure after only 8 hours.

Typical filter mesh sizes are from 20 mesh to 1000 mesh, for example, 20 mesh, 100 mesh and 500 mesh. The higher the mesh number the finer the filtration. The process of the present invention preferably employs a filter fineness of at least 20 mesh, more preferably at least 100 mesh, more preferably at least 500 mesh and most preferably in series of 20 mesh, 100 mesh and 500 mesh so that the upstream filters filter out the largest particles and the downstream filters filter out the fine particles.

Example 3 was a polypropylene composition containing 800 ppm bis(2,4-di-tert-butylphenyl) pentaerythritol diphosphite, 500 ppm calcium stearoyl lactate, and 250 ppm tris(3,5-di-t-butyl-4-hydroxy benzyl) isocyanurate, and exhibited no screen pack plugging pressure rise during extended use.

Comparative Example 4 was a composition having the formation of Example 3 except the calcium stearoyl lactate was replaced with calcium stearate, and exhibited a substantial rise in pressure during melt extrusion due to screen packplugging.

Example 5 was a polypropylene composition containing 600 ppm bis(2,6-di-tert-butyl-4-methylphenyl) pentaerythritol diphosphite, 500 ppm calcium stearoyl lactate. The composition exhibited no screen pack plugging pressure rise during 13 hours of operation.

Comparative Example 6 is a polypropylene composition as in example 5 that the calcium stearoyl lactate was replaced with calcium stearate, and the composition exhibited a 200 psi pressure rise in 7 hours of operation.

What is claimed is:

1. An extrusion process for making a polyolefin film said process comprising:

forming a polyolefin composition comprising a polyolefin resin, an organic phosphite ester stabilizer, and a metal salt of a lactic acid, said phosphite stabilizer being selected from the group consisting of tetrakis(2,4-di-t-butyl-phenyl) 4,-4'-biphenylylene diphosphonite, tris (2,4-di-t-butylphenyl)-phosphite, trisnonylphenyl phosphite, bis(2,4-di-t-butylphenyl)pentaerythritol diphosphite, and bis(distearyl)pentaerythritol diphosphite, said metal salt being a bivalent salt of lactic acid, said polyolefin composition comprising from 90 to 99.5 weight percent polyolefin resin, from 0.001 to 5 weight percent phosphite stabilizer, and from 0.01 to about 5 weight percent of said metal salt, b) melt extruding said composition through a filtration system to produce a filtered polyolefin melt stream, said filtration system a plurality of filter screens, c) passing said filtered melt stream through an elongated die orifice to to form a polyolefin film.

2. The process of claim 1 wherein said phosphite is a pentaerythritol phosphite.

3. The process of claim 2 wherein said phosphite is a bis(2,4-di-tert-butylphenyl)pentaerythritol diphosphite.

4. The process of claim 1 wherein said polyolefin is polypropylene.

5. The process of claim 3 wherein said polyolefin is polypropylene.

6. The process of claim 1 wherein said polyolefin is polyethylene.

7. The process of claim 1 wherein one of said screen filters has a mesh size of between 20 and 500 mesh.

8. The process of claim 1 wherein said filtration system is a screen pack comprising at least two filters, wherein one of said filters has a mesh size of greater than 100 and another of said filters has a mesh size of less than 100.

9. The process of claim 1 wherein said metal salt of a lactic acid in a calcium salt of a lactic acid.

10. The process of claim 9 wherein said metal salt of a lactic acid is selected from the group consisting of calcium lactate and calcium 2-stearoyl lactate.

* * * * *

UNITED STATES PATENT AND TRADEMARK OFFICE
CERTIFICATE OF CORRECTION

PATENT NO. : 6,022,916
DATED : February 8, 2000
INVENTOR(S) : William P. Enlow, Roger W. Avakian Page 1 of 1

It is certified that error appears in the above-identified patent and that said Letters Patent is hereby corrected as shown below:

On the title page of the patent, the filing date is incorrect.

Item [62] please correct filing date to be Mar. 29, 1993.

Signed and Sealed this

Thirty-first Day of July, 2001

*Attest:*

*Attesting Officer*

NICHOLAS P. GODICI
*Acting Director of the United States Patent and Trademark Office*